UNITED STATES PATENT OFFICE.

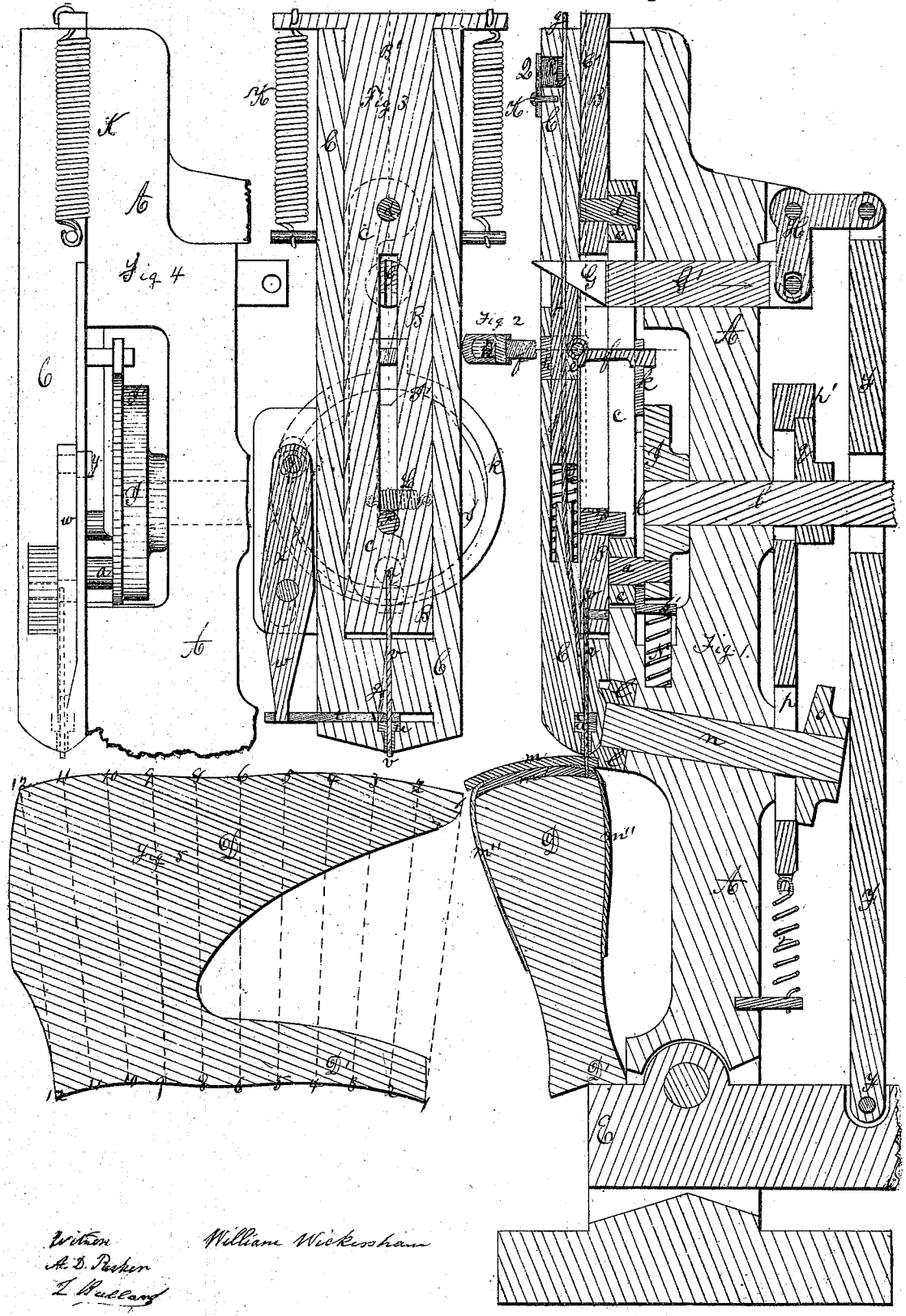

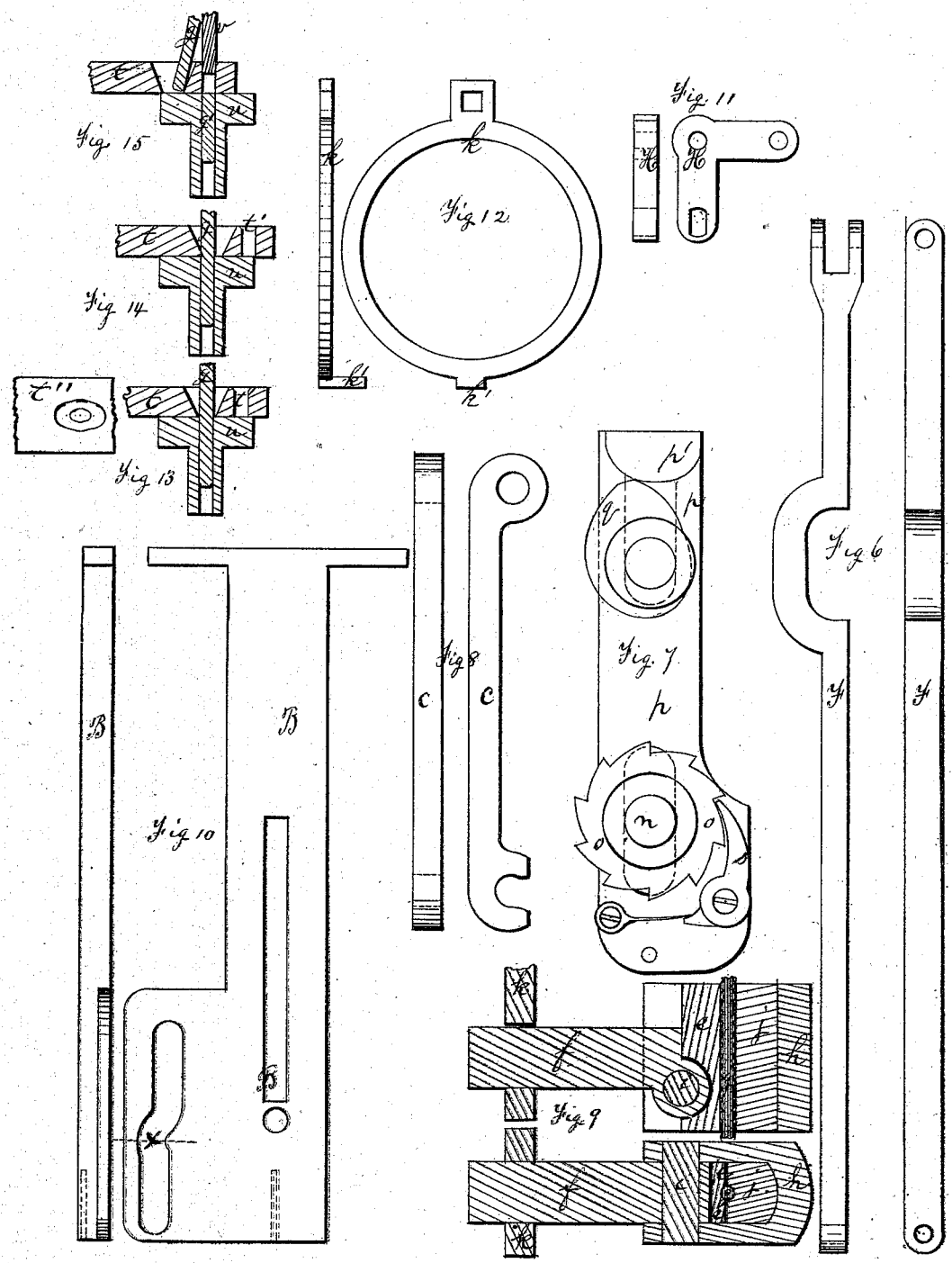

WILLIAM WICKERSHAM, OF BOSTON, MASSACHUSETTS.

IMPROVED WIRE-DRIVING MACHINE FOR MANUFACTURING BOOTS AND SHOES.

Specification forming part of Letters Patent No. 106,011, dated August 2, 1870.

I, WILLIAM WICKERSHAM, of Boston, in the county of Suffolk and State of Massachusetts, have invented certain Improvements in Wire-Driving Machines for Attaching the Soles of Shoes and Boots to their Vamps, of which the following is a specification:

*Nature and Objects of my Invention.*

The first feature of my invention relates to the adaptation of the length of each piece of wire cut off to the thickness of the sole at the place where said piece is to be driven in; and consists, first, in having the upper surface of the sole of the shoe (as it is placed in the machine) fed by passing under a feed-wheel or other feeder, in such manner that the part of the surface around and near the edge where the wires are inserted shall be kept substantially at the same elevation while the wires are being driven in; second, by having an attachment to the last underneath it, corresponding somewhat to the upper surface of the last on which the sole rests, except that it is a little narrower and shorter, but having all the corresponding parts of its under surface equally distant from the upper surface of the last around its edge, and as far in from the edge as the wires are driven; third, by having the under surface of this said attachment to the last rest on a lever, the other end of which is connected with a variable surface in the upper part of the machine, in such manner as to cause this variable surface to vary in elevation with the varied thickness of the sole, and to the same amount, one-tenth of an inch greater thickness in the sole making one-tenth inch greater elevation of said surface, &c.; fourth, having a feeding-tube so arranged that it will feed the wire down to the cutting apparatus equal in length to the distance of its movement, the limit of its downward movement being fixed at a given elevation, while the limit of its upward movement varies with said variable surface, so that, the sole one-tenth inch thicker, this feeding-tube will carry the wire down one-tenth inch farther below the cutting apparatus, and a piece of wire one-tenth inch longer will be cut off to be driven into the sole next time the driver descends; fifth, a cutting apparatus by which each piece of wire is cut off, and, at the same time, sharpened or pointed at the front or forward end, by having the upper surface forming the cutting-edge inclined to the lower surface of the instrument at an angle of about sixty degrees, or any suitable angle for the purpose, and by having the said cutting-edge in an oblong or oval form, with the middle part being just large enough to admit the wire to pass through, while the ends are considerably smaller than the wire, so that, when a suitable length of the wire is passed through the middle portion of this oblong hole forming the cutting-edge, and one end of the oblong edge is pressed against the wire and part way into it, (the wire being held firmly in its place by fitting closely in a hole below the cutting instrument,) will give its bevel form to the wire half-way round it, and then, by this end being withdrawn, and the other end of the edge pressed against the other side of the wire, and entirely through, it bevels or points the other side or half of the wire, while the upper end of the part cut off is left square.

The second feature of my invention relates to the manner of raising the driver and driver-stock to their upper position, and then forcing them to their lower position; and consists of a crank-pin and a connection-rod, said rod being attached to the driver-stock at the upper end, and having an open bearing at the lower end for the crank to pass into, so that the crank, in coming to its lowest position, passes into the end of the connection-rod, raises it and the driver-stock to their highest position in turning one-half of a revolution, when the crank-pin leaves the connection-rod and the driver-stock free to descend to their lowest position, to which position it is forced by springs.

The third feature of my invention relates to the cutting and driving of the wire; and consists in having the plate used as a cutting instrument formed with one oblong hole for the cutting-edge, and another for the driver to pass through, so that when a wire is cut off, the cutter-bar is moved until the hole for the driver is immediately under said driver, but in moving the cutter-bar to that position the portion of the wire above the lower surface of the plate is carried laterally out of the way of the driver, allowing said driver free passage downward onto the piece of wire just cut off to be driven into the sole.

Figure 1 shows a perpendicular section of my machine, from the front to the back, in the dotted line B'. Fig. 2 is a cross-section of the wire-feeding apparatus. Fig. 3 is a perpendicular section through the driver, cutting apparatus, &c., at right angles to Fig. 1, in the dotted lines C'. Fig. 4 is a side elevation of the upper portion of the machine. Fig. 5 is a longitudinal section of the last and the gage underneath it. Fig. 6 shows a side and edge elevation of the connection-rod between the lever on which the last rests and the variable surface above. Fig. 7 gives a back view of the apparatus for feeding the shoe round. Fig. 8 gives a side and edge view of the connection-rod between the crank and the driver-stock. Fig. 9 shows perpendicular and horizontal sections of the wire-feeding apparatus on a large scale. Fig. 10 shows a side and edge view of the driver-stock. Fig. 11 is a side and edge view of a crank between one of the connection-rods and the variable surface. Fig. 12 shows a connecting-link, $k$, between the cam I' on the crank-wheel and the small lever $f$ in the wire-feeding apparatus. Figs. 13, 14, and 15 show three perpendicular sections of the wire-cutting apparatus.

A is the stand, to which the various parts of the machine are attached. B is the driver-stock. C is the face-plate. D is the last. D' is the gage, attached to the last, having an under surface equally distant in all of its parts from the upper surface of the last, as placed in the machine. E is the lever that the gage D' rests upon. F is the connection-rod which connects the lever E with the variable surface G through the crank H. I is the crank-wheel, and I' is the cam on the same. $a$ is the crank-pin. $b$ is the crank-shaft. $c$ is the connection-rod connecting the crank-pin $a$ with the driver-stock B, through the pin $d$. $e$ is a small clamp in the wire-feeding apparatus, which the lever $f$ presses against the wire $g$. (More perfectly shown on a large scale in Fig. 9.) $h$ is the other part of the clamp, attached to the lever $f$ by the pin $i$, and extending around the feed-tube $j$, and may be a part of said tube, enabling the lever $f$, in an obvious manner, to bind the clamp $e$ against the wire $g$ when said lever is forced downward, thereby causing the tube and wire to move down together when the lever $f$ is moved down, which is done by the link $k$ being moved downward by the cam I', on the crank-wheel I, moving against the projection $k'$. $l$ is the feed-wheel, which the shoe-sole $m$ is pressed against, and fed along when the feed-wheel turns. $n$ is the shaft of the feed-wheel. $o$ is the ratchet-gear on the opposite end of the shaft $n$ to the feed-wheel. $p$ is a bar, having two slots, through which the two shafts $b$ and $n$ pass, and is so arranged that the cam $q$ will raise it up every revolution of said shaft, and the spring $r$ forcing it to its first position when released from said cam. On the lower end of said bar there is a pawl, $s$, so arranged that it will turn the ratchet-gear one tooth when the cam $q$ raises the bar up, thereby causing the feed-wheel to turn the same number of degrees.

$t$ is the cutter-bar, (shown on a large scale at Fig. 13, Sheet 2,) and $t'$ is the hole for the driver to pass through. $u$ is a block set firmly into the face-plate, with a perpendicular hole through it, just large enough for the wire to pass through closely. This block is placed immediately under and close to the cutter-bar. $v$ is the punch. $w$ is the lever which operates the cutter-plate, and receives its motion from the irregular slot $x$ in the driver-stock B through the pin $y$. $z$ is a spring at the lower end of the wire-driving tube $j$, to keep it up against the variable surface G when it is released from being drawn down. L is a spring, to hold the connection-rod $c$ in its proper position when at rest, and to hold it against the crank when the said crank is carrying it upward. K K are the two springs which bring the driver-stock down after the crank has carried it up. N is a spring, which raises the link $k$ to its upper position after it has been moved down by the cam I'.

Having explained the different parts of my machine, I will proceed to explain its operation.

The last, with the shoe on it, as represented by D $m$ $m'$ $m''$, Fig. 1, is placed with a gage, D', on the end of the lever E, and the sole $m$ resting against the under side of the feed-wheel $l$. The crank-wheel I begins to turn in the direction indicated by the arrow-point, Fig. 3. The first effect of this is to raise the driver-stock up by the crank through the connection-rod $c$. When this is raised up nearly half-way, and the driver is above the cutter-bar $t$, then the cutter-bar is moved so as to bring the hole which cuts the wire directly over the hole in the block $u$, by means of the slot $x$ moving upward and acting on the pin $y$, thereby, in an obvious manner, causing the lever $w$ to operate the cutter-bar. When the cutter-bar is in this position the cam I' moves the link $k$ downward, carrying along with it the lever $f$, causing said lever first to force the clamp $e$ against the wire $g$, binding it to the wire-tube $j$, then causing said wire-tube and the wire to move downward; but when the cam I' passes by the projection $k'$ the spring N throws the link $k$ upward, releasing the wire from the wire-tube and allowing the wire-tube to rise (without carrying the wire) to its first position, leaving the wire in the lowest position that it was carried down, as shown more plainly on a large scale at Fig. 13, where the wire $g$ is in the position to be cut off.

Next result of the motion of the machine will be (except feeding the shoe, hereafter to be described) to release the connection-rod $c$ from the crank $d$, which allows the driver-stock and its driver to fall, by the force of the springs K K, to its lowest position, driving, in its course, the piece of wire cut off and resting in the block $u$ in the sole. This said piece of wire is cut off during the downward passage of the driver, just described, in the following manner:

When the driver-stock has passed about half-way in its descent, and the point at the dotted line at $x$ in the slot $x$ has reached the pin $y$, then the cutter-bar $t$ will be in the position shown in Fig. 14. The left-hand end of the oval-shaped edge will be pressed into the wire $a$ a little way, making an indentation into the wire, inclined to its axis above the edge, but perpendicular to it below the edge; but, as this edge is less in diameter at its ends than the wire, as shown in a top view at $t''$, Fig. 13, this indentation will extend half-way round the wire; but, as the driver-stock continues to fall, the pin $y$ passes into the upper part of the slot $x$, and, in doing so, causes (through the lever $w$) the cutter-bar to move in the opposite direction, and the other end of the cutting-edge of the cutter-bar to cut into the other side of the wire, making the same kind of indentation as before described; but in this case the motion of the cutter-bar is continued until the wire is entirely severed and the cutter-bar reaches the position shown in Fig. 15, carrying the lower end of the wire above the cut along with it, out of the way of the driver $v$, which has just entered the hole $t'$, and is rapidly approaching the piece of wire $g'$ just cut off, to drive it into the sole.

After the wire $g'$ is thus driven into the sole the feeding of the shoe may commence, and it is desirable to have that continue as great a portion of the revolution of the machine as it can do without interfering with other work of the machine, and it is effected in the following manner: The cam $q$ on the shaft $b$ acts on the projection $p'$, and raises the bar $p$ upward, causing the pawl $s$ on it to turn the ratchet-gear $o$ round one tooth, and to turn the feed-wheel $l$, through the shaft $n$, the same amount; and, as the sole $m$ of the shoe is pressed against the feed-wheel, it is moved the same distance as is the surface of the feed-wheel, said surface being roughened, to make it adhere to the leather, in a way well known to the arts.

When the crank-pin $d$ passes into the open bearing in the lower end of the connection-rod $c$, it is held in its position on the pin by the spring L until it reaches its highest position, and then the connection-rod strikes against the stud P, when the crank-pin passes out of it, leaving it free to pass down with the driver-stock, before described.

The explanation of my method of feeding down the wire, of cutting a piece off of the lower end, and driving it into the sole, already given, would be complete if the sole was always the same thickness, requiring the piece cut off to be always the same length; but as this is not the case, different soles being of different thickness, and the thickness of the same sole often varying in different parts, so as to require wire of different lengths, it remains for me to explain the automatic arrangement by which my machine cuts off pieces of wire the same in length as the thickness of the sole at any time under the driver, of whatever thickness, always adapting the length of the wire to the thickness of the sole, however much that may vary. This is effected in the following manner:

Now, suppose that, by moving the rod $G'$ to the right, as indicated by the arrow-point, one-fifth of an inch, it would leave a perpendicular space between the upper end of the wire-tube $j$ and the inclined surface G of one-tenth of an inch. It is plain that the wire-tube can rise one-tenth of an inch higher, and as the point of its downward movement is fixed, it would have one-tenth of an inch greater movement, and, as the distance the wire is fed down is equal to the whole extent of movement of the wire-tube, it would feed the wire down one-tenth of an inch farther than before. Now, this is just what happens if a tenth of an inch thickness is added to the sole, for the place of the upper surface of the sole is fixed, so that any additional thickness must move the last downward. This being the case, we will increase the thickness by any amount, say one-tenth of an inch. The last D and the end of the lever E, at E, would be moved downward one-tenth of an inch. The other end of the lever, at F, twice the distance from the fulcrum, will be elevated twice as much, (one-fifth of an inch,) and the rod F communicates the same motion to the rod $G'$ through the crank H, and the inclination of the surface at G is such as to make half the variation in its perpendicular elevation as its lateral motion. Moving laterally to the right, then, one-fifth of an inch (which one-tenth additional thickness of the sole would cause) would give one-tenth more space above the wire-tube, giving it that much more movement. Consequently, the condition for feeding the wire one-tenth of an inch farther, just the additional thickness of the sole, and so of any other additional thickness.

The distance from the upper surface of the last to the lower surface of the gage is the same in every part—that is, the lines 1 1, 2 2, 3 3, 12 12, &c., Fig. 5, are all the same, so that an increase of thickness in any part of the sole will cause an increase in the length of wire to be driven in.

At 2, Fig. 1, there is an arrangement by which a slight friction is produced on the wire $g$, so that when it is fed downward and let go by the feeding apparatus it will remain fixed in its position until the lower end is cut off and until the feed-clamp takes hold of it again for another downward movement. This consists of a small india-rubber or other spring, R, pressing a small plate against the wire, and this is held in place by an outside plate, Q.

The wire for which this machine is adapted is shown in section in Fig. 9, having a succession of larger and smaller diameters, with the larger portions rounded.

This invention has for its object reduction of cost, at the same time improvement in quality in one the great staple branches of industry of this country.

Thus describing my invention, I claim—

1. The combination of the feeding-tube $j$ with the variable surface G, for the purpose of determining the length of each piece of wire to be cut, adapting its length to the thickness of the sole at the place where it is to be driven in, substantially in the manner and for the purpose set forth.

2. A last, D, in combination with the gage D', formed as described, and for the purpose set forth.

3. The lever E and the variable surface G, when connected by suitable devices, for the purpose and substantially in the manner set forth.

4. The combination of the lever $f$, the clamp $e$, and the wire-tube $j$, in the manner and for the purposes set forth.

5. The combination of the cam I', the link or connection $k$, and the lever $f$, operating as described.

6. In wire-driving machines, the construction of the connection-rod $c$ with one open bearing, as described, and for the purpose specified.

7. The combination of the crank-pin $a$, the connection-rod $c$, and the spring or springs K K, for the purpose set forth.

8. A cutter-bar, $t$, with a cutting-edge formed around the wire, in the manner described, so that with proper movements it can be made to cut off a piece of wire, and at the same time bevel or point the lower end of the remaining wire on both sides, as described, and for the purpose set forth.

9. The combination of the slot $x$, the lever $w$, and the cutter-bar $t$, operating substantially as described, for the purpose of cutting and pointing the wires to be driven into shoe or boot soles, and carrying the wire from which a piece has been cut out of the way of the driver as it descends, substantially as and for the purpose set forth.

10. The spring R, with the two plates Q and Q', for giving friction to the wire $g$, when used in connection with wire-driving machines, for the purpose specified.

11. Combined with the wire-feeding apparatus, as herein described, the wire-cutting device, as specified, for the purpose set forth.

12. The elongated form of the cutting-edge in the cutting-bar $t$, having the diameters of the elongated ends smaller than that of the wire, for the purpose set forth.

WILLIAM WICKERSHAM.

Witnesses:
  A. D. PARKER,
  L. BULLARD.